United States Patent [19]

Mitsuhashi et al.

[11] Patent Number: 4,853,848
[45] Date of Patent: Aug. 1, 1989

[54] BLOCK ACCESS SYSTEM USING CACHE MEMORY

[75] Inventors: Masato Mitsuhashi, Hiratsuka; Takeshi Kitahara, Yokohama, both of Japan

[73] Assignee: Fujitsu Limited, Kawasaki, Japan

[21] Appl. No.: 163,911

[22] Filed: Mar. 3, 1988

[30] Foreign Application Priority Data

Mar. 10, 1987 [JP] Japan .................................. 62-54901

[51] Int. Cl.$^4$ ............................................ G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,156,906 | 5/1979 | Ryan | 364/200 |
| 4,217,640 | 8/1980 | Porter | 364/200 |
| 4,325,120 | 4/1982 | Colley | 364/200 |
| 4,445,176 | 4/1984 | Burk | 364/200 |
| 4,455,602 | 6/1984 | Baxter | 364/200 |
| 4,493,027 | 1/1985 | Katz | 364/200 |
| 4,525,780 | 6/1985 | Bratt | 364/200 |

Primary Examiner—David Y. Eng
Attorney, Agent, or Firm—Armstrong, Nikaido, Marmelstein, Kubovcik & Murray

[57] ABSTRACT

A block access system using a cache memory comprises a first control circuit for producing a block access request for requesting read-out of all data included in a block of a predetermined size in response to an access request from an operation unit and inputting the data read out from a main memory unit into a cache memory, and a second control circuit for reading out data from the main memory unit and sending back to the first control circuit a response signal which indicates any one of execution and cancellation of the requested block access in response to the block access request from the first control means. Memory addresses necessary for reading out all the data in one block are produced by the first control circuit when the block access request is cancelled. Alternatively, memory addresses are supplied by the second control circuit when the block access request is executed.

14 Claims, 16 Drawing Sheets

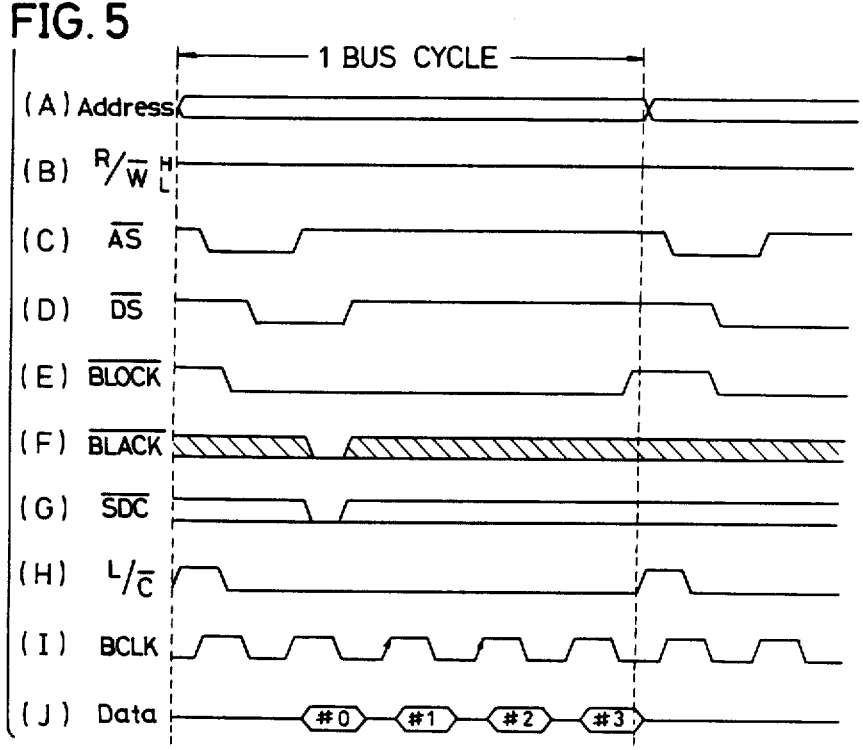
FIG. 5
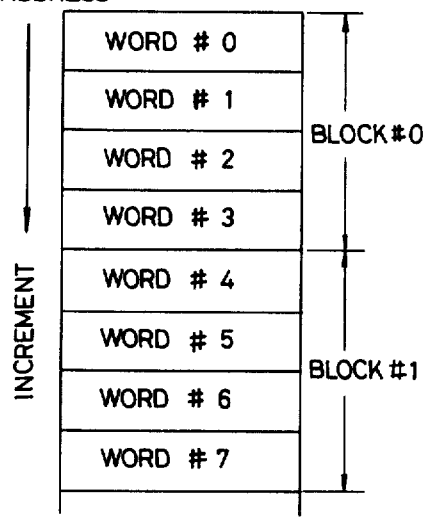
FIG. 7A
FIG. 7B
| HEAD WORD REQUESTED | WORD TRAN SEQ |
|---|---|
| WORD # 0 | 1 → 2 → 3 |
| WORD # 1 | 2 → 3 → 0 |
| WORD # 2 | 3 → 0 → 1 |
| WORD # 3 | 0 → 1 → 2 |

BLOCK ACCESS SYSTEM USING CACHE MEMORY

BACKGROUND OF THE INVENTION

The present invention generally relates to a block access system using a cache memory, and in particular to a block access system using a cache memory in which a cache memory, provided on both sides of bus lines between a central processing unit or an operation unit and a main or external memory unit, holds data from the main memory so that the central processing unit can reach it quickly. The present invention further relates to a microprocessor in which a cache memory, an operation unit, and a control circuit for controlling a cache-in operation are built.

Block access systems using cache memories are widely being incorporated in computer systems. In general, cache memories are externally coupled with a central processing unit (hereafter simply referred to as CPU) in computer systems or are built in the CPU. Currently, microprocessors including cache memories are available. Cache memories are used to hold information from a main memory unit or an external memory unit so that the CPU can get it quickly.

In general, when the CPU does not find necessary data such as numerical values and instructions in the cache memory (at the time of miss hit), the CPU inputs the necessary data into the cache memory from the memory unit. At this time, data included in a memory region (a block) of a predetermined size is transferred from the memory unit to the cache memory in accordance with a sequence. In other words, data is transferred per block. Such an operation is called a cache-in operation. Generally, mutually related data are stored in the memory unit with successive addresses. Therefore, at the time of the cache-in operation, one data block is transferred to the cache memory within a single bus cycle in response to a single address supplied to the memory unit by the CPU. This is called a block access. Generally, one block consists of a plurality of words. Therefore, at the time of the block access, these words are successively transferred within one bus cycle in response to one address from the CPU.

In a conventional block access system, a timing for transferring each of the words in the one block after the request of the block access from the CPU is predetermined for individual computer systems. For this reason, the block access is always carried out in accordance with the predetermined timing.

The main memory unit is generally built by various memories of different access times such as dynamic random access memories (hereafter simply referred to as D-RAMs) and static random access memories (hereafter simply referred to as S-RAM). As well known, access times of S-RAMs are shorter than those of D-RAMs. When a computer system is built by memories of different access times such as the D-RAMs and S-RAMs, the timing for the block access must be selected so as to be conformable to the memory having the longest access time. For this reason, the conventional block access cannot be carried out at a high-speed, and thus system performances are poor.

Further, the conventional block access has the following disadvantage. Generally, in order to build the computer system using the block access, memories or memory regions in the memory unit which are subject to the block access must be designated at the time of building the computer system. The CPU requests the block access only for memories or memory regions. For this reason, the degree of flexibility of system design is poor.

SUMMARY OF THE INVENTION

Accordingly, a general object of the present invention is to provide a novel and useful block access system using a cache memory in which the disadvantages of the conventional block access systems have been eliminated.

A more specific object of the present invention is to provide a block access system using a cache memory in which a block access can be made at a high-speed.

Another object of the present invention is to provide a block access system using a cache memory in which a flexible system design is possible.

The above objects of the present invention is achieved by a data transfer system using a cache memory comprising a main memory unit for storing data; an operation unit for carrying out operations and producing a single memory address and an access request to read out data stored in the main memory unit; a cache memory for storing the data read out from the main memory unit; a bus for connecting the cache memory with the main memory unit; a first control circuit for producing a block access request for requesting readout of all data included in a block of a predetermined size in response to the access request from the operation unit and inputting the data read out from the main memory unit into the cache memory; and a second control circuit for reading out data from the main memory unit and sending back to the first control circuit a response signal which dictates either one of execution and cancellation of the requested block access in response to the block access request from the first control circuit. The first control circuit comprises a first address supply circuit (an address bus interface circuit) for supplying the single memory address from the operation unit to the second control circuit when the response signal indicates the execution of the requested block access and for supplying the single memory address and memory addresses necessary to read out all the data of one block to the second control circuit when the response signal indicates the cancellation of the requested block access. The second control circuit comprises a second address supply circuit (an address bus interface circuit) for supplying the main memory unit with the single memory address and memory addresses necessary to read out all the data of one block when the requested block address is executed and for supplying the main memory unit with the addresses provided from the first control circuit when the requested block address is cancelled.

A further object of the present invention is to provide a microprocessor in which a cache memory, an operation unit, and a control circuit for controlling a cache-in operation are built.

Other objects, features and advantages of the present invention will become apparent from the following detailed description when read in conjunction with the accompanying drawings.

BRIEF DESCRIPTION OF THE DRAWINGS

FIGS. 5(A) through 5(J) are operating time charts of the embodiment shown in FIG. 1 where the block access is permitted and a wait cycle is not inserted into an operating cycle of an operation unit shown in FIG. 1;

FIGS. 7A and 7B are views for explaining a relation between a word and a block as well as a transfer sequence of words;

DETAILED DESCRIPTION

A description will be given of an embodiment according to the present invention.

Figure 1:
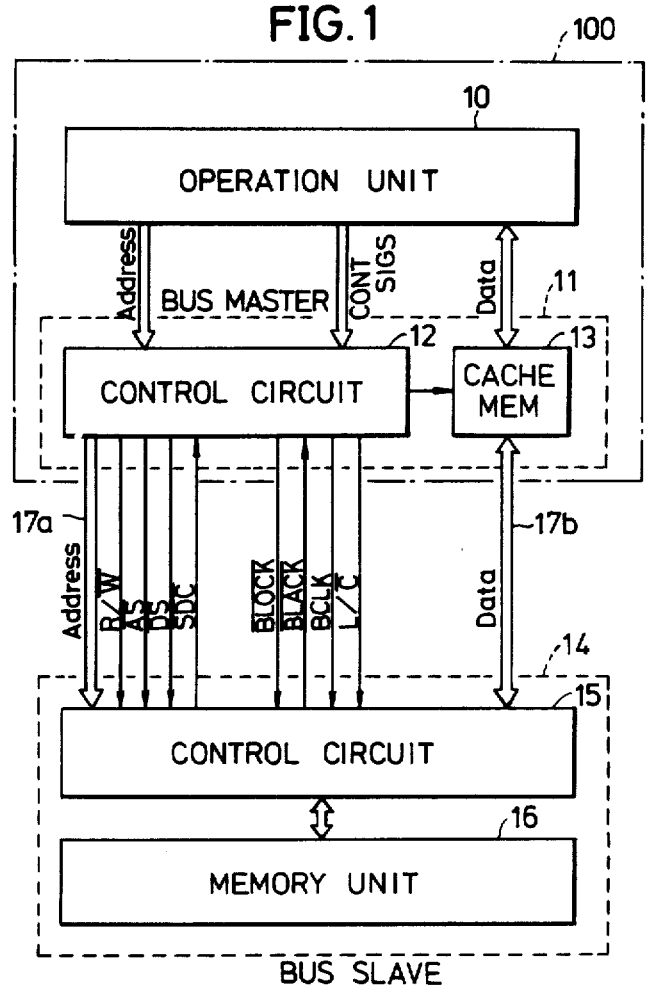
FIG. 1 is a block diagram of an embodiment of a system according to the present invention.

FIG. 1 is a schematic block diagram of a block access system according to the present invention. A microprocessor 100 includes a CPU or an operation unit (also called an execution unit) 10 and a bus master 11 which comprises a control circuit 12 and a cache memory 13. In the illustrated embodiment, the microprocessor 100 is a 32-bit microprocessor. The operation unit 10 provides the control circuit 12 with an address composed of 32 bits and control signals. The operation unit 10 also sends and receives data to and from the cache memory 13.

The control circuit 12 and the cache memory 13 are connected to a control circuit 15 to a bus slave 14 by a bus line including an address bus 17a and a data bus 17b. The control circuit 12 of the bus master 11 provides the control circuit 15 of the bus slave 14 with the address of 32 bits and control signals having a read/write signal $R/\overline{W}$, an address strobe signal $\overline{AS}$, data strobe signal $\overline{DS}$, a block access request signal $\overline{BLOCK}$, a bus clock signal BCLK, and a load/count signal $L/\overline{C}$. The control circuit 15 of the bus slave 14 provides the control circuit 12 with control signals having a send completion signal $\overline{SDC}$ and a block access acknowledge signal $\overline{BLACK}$. Data of 32 bits is transferred between the cache memory 13 and the control circuit 15 of the bus slave.

In the following description, signals denoted by signal letters together with bars are low-active signals.

The bus slave 14 includes a main memory unit 16 in addition to the control circuit 15. A read/write operation for the memory unit 16 is controlled by the control circuit 15. The memory unit 16 has memories (or memory regions) of relatively short access times such as S-RAMs as well as memories (memory regions) of relatively long access times such as D-RAMs. The access times of the memories or memory regions in the memory unit 16 must be considered with respect to an operating cycle of the operation unit 10. A "short" access time means that the access time of the memory or memory region is shorter than the operating cycle of the operation unit 10, and a "long" access time means that the access time of the memory or memory region is longer than the operating cycle of the operation unit 10.

A summary of operation of the system of FIG. 1 is as follows. When there exists no data in the cache memory 13 necessary to execute instructions, the operation unit 10 provides the control circuit 12 with a data read request and an access request in order to obtain access to data stored in the memory unit 16. The control unit 12 outputs an address relating to the necessary data on the address bus 17a, and simultaneously generates control signals, i.e., the read/write signal $R/\overline{W}$, the load/count signal $L/\overline{C}$, the address strobe signal $\overline{AS}$ and the data strobe signal $\overline{DS}$. These signals are supplied to the control circuit 15 of the bus slave 14 so that the bus slave 14 transfers the data. In addition, the control circuit 12 of the bus master 11 outputs the block access request signal $\overline{BLOCK}$ to the control circuit 15 of the bus slave 14. The control circuit 15 reads out one word included in the requested data block (one block consists of four words, for example) from the memory unit 16, and sends it to the cache memory 13 through the data bus 17b, when the requested data is permitted to be transferred by the block access. At this time, the control circuit 15 of the bus slave 14 also sends (asserts) both the send completion signal $\overline{SDC}$ and the block access acknowledge signal $\overline{BLACK}$ to the control circuit 12 of the bus master 11. The end completion signal $\overline{SDC}$ is produced (switched into a low-level) when the data transfer from the memory unit 16 to the control unit 15 is completed. The block access acknowledge signal $\overline{BLACK}$ is produced (switched into a low-level) when the requested block access is acceptable. Subsequently, the control circuit 15 read out the following words from the memory unit 16 by sequentially incrementing the address sent from the bus master 11. Each word read out from the memory unit 16 is continuously sent to the cache memory 13 by using the bus clock signal BCLK sent from the bus master 11. When the control circuit 12 detects both the send completion signal $\overline{SDC}$ and the block access acknowledge signal $\overline{BLACK}$, the control circuit 12 detects that the block access has been accepted by the bus slave 14. Then, the control circuit 12 samples the data and inputs the data into the cache memory 13. It is noted that the transfer of one block is completed within a single bus cycle of the system.

Alternatively, when the requested data is not permitted to be transferred by the block access, the control circuit 15 of the bus slave 14 outputs only the send completion signal $\overline{SDC}$ to the control circuit 12 of the bus master 11 together with one word of the block. That is, the block access acknowledge signal $\overline{BLACK}$ is not asserted. When only the send completion signal $\overline{SDC}$ is detected, the control circuit 12 increments the addresses in sequence and sends them to the control circuit 15 of the bus slave 14. Then, each word which is designated by the respective addresses provided by the control circuit 12 is read out from the memory unit 16, and is sent to the bus master 11. That is, when the block access is cancelled by the bus slave 14 by asserting only the send completion signal $\overline{SDC}$, the transfer of the words following the first one word is performed in accordance with the general access method in which each data is read out from the memory unit 15 by supplying the respective addresses to the bus slave 14 from the bus master 11. It is noted that in this case, each data (word) of one block is sent to the bus master 11 for every one bus cycle.

Figure 2:
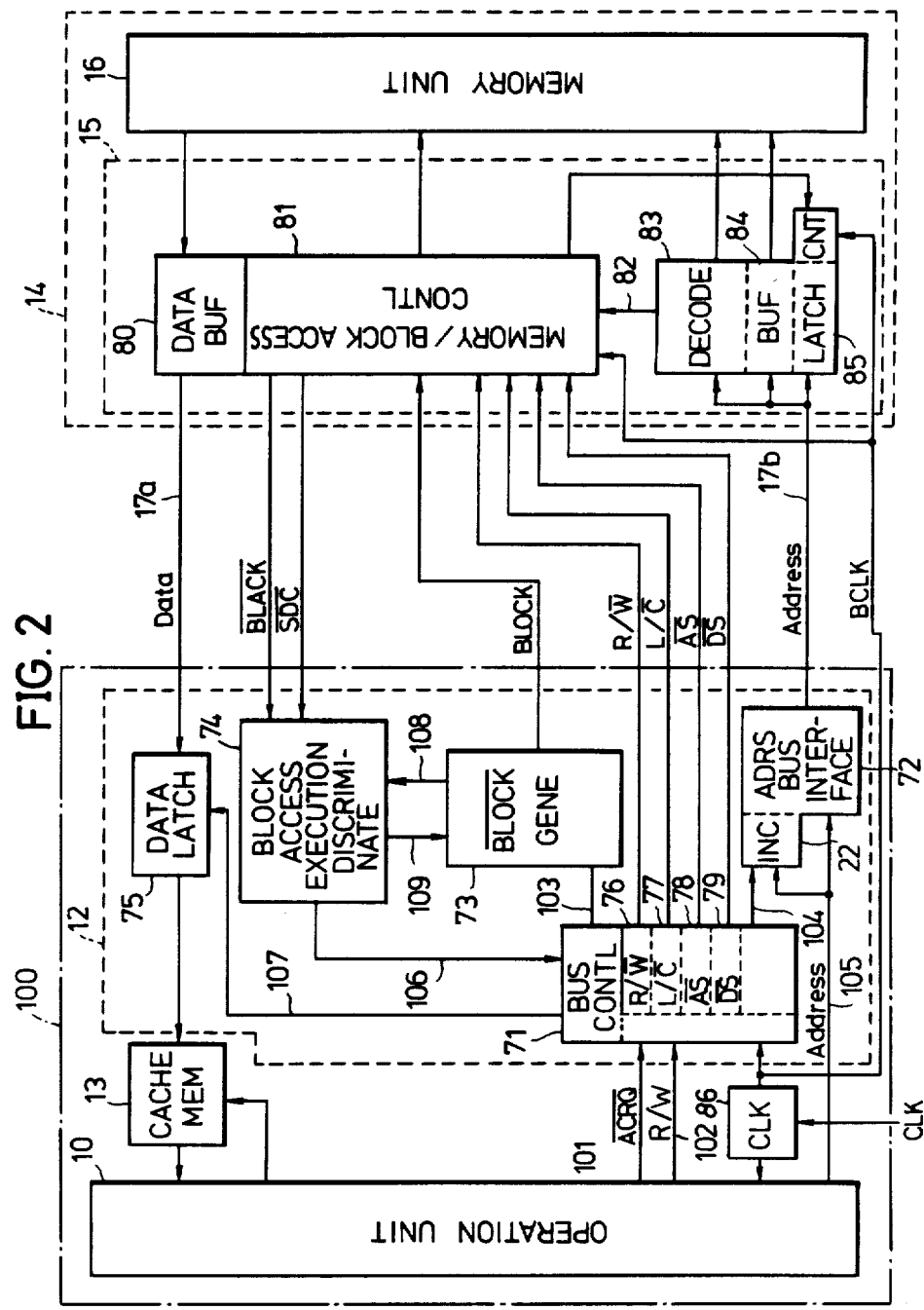
FIG. 2 is a block diagram showing a detailed structure of the embodiment shown in FIG. 1.

FIG. 2 shows a detailed configuration of the block access system shown in FIG. 1. Referring to this figure, the control circuit 12 of the bus master 11 consists of a bus controller 71, an address bus interface circuit 72 including an address incrementer 22, a block access request signal generator (hereafter simply referred to as $\overline{BLOCK}$ generator) 73, a block access execution discriminating circuit 74 and a data latch circuit 75. The bus controller 71 includes a read/write signal generator (hereafter simply referred to as R/$\overline{W}$ signal generator) 76, a load/count signal generator (hereafter simply referred to as L/$\overline{C}$ signal generator) 77, an address strobe signal generator (hereafter simply referred to as $\overline{AS}$ signal generator) 78, and a data strobe signal generator (hereafter simply referred to as $\overline{DS}$ signal generator) 79. The operation unit 10 and the control circuit 12 are built in the microprocessor 100. The microprocessor 100 build a clock supply circuit 86 therein. The clock supply circuit 86 frequency-divides a clock signal CLK from an external circuit (not shown) and makes the bus clock signal BCLK.

Figure 3:
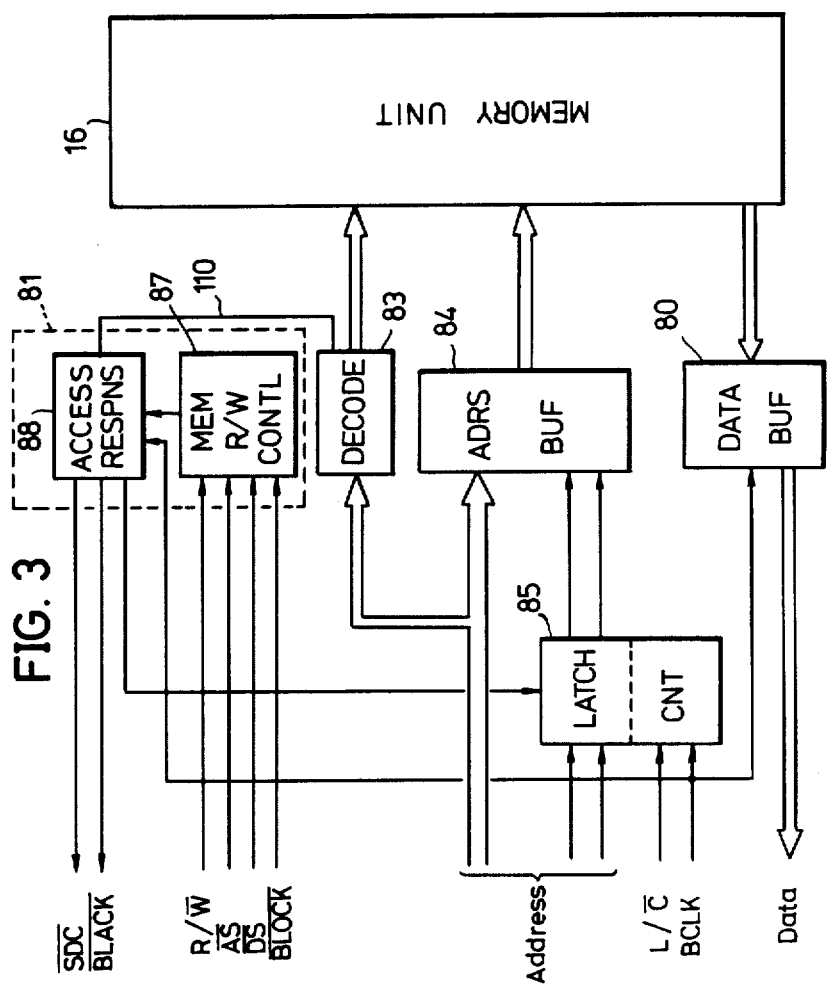
FIG. 3 is a block diagram showing a detailed structure of a bus master shown in FIGS. 1 and 2.

The control circuit 15 of the bus slave 14 comprises a data buffer 80, a memory/block access controller 81 and an address bus interface circuit 82 which consists of an address decoder 83, an address buffer 84 and an address counter 85 which has a latch function. A more detailed structure of the control circuit 15 of the bus slave 14 is shown in FIG. 3. As seen from this figure, the memory/access controller 81 consists of a memory read/write controller 87 and an access response circuit 88.

A further description will be given on an operation the embodiment shown in FIGS. 1 through 3 at the time when data is transferred from the memory of the short access time such as the S-RAM, by referring to FIGS. 4(A) through 4(J).

Figure 4:
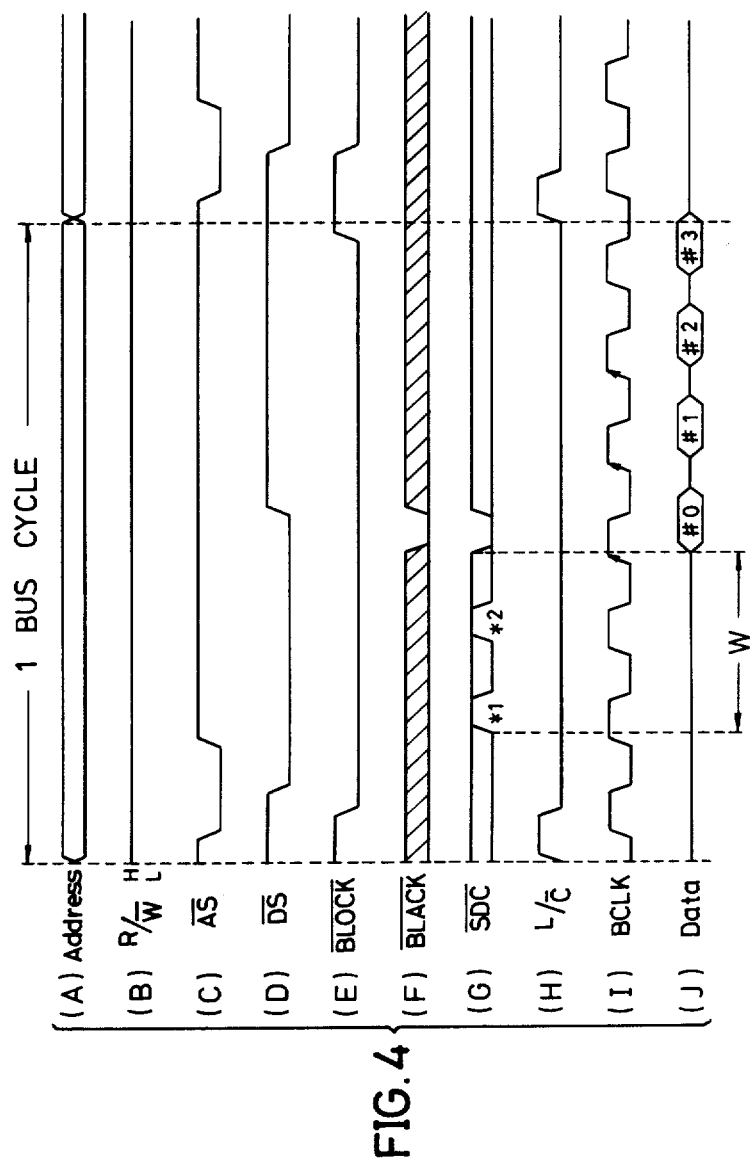
FIGS. 4(A) through 4(J) are operating time charts of the embodiment shown in FIG. 1 where a block access is permitted.

The operation unit 10 sends an access request $\overline{ACRQ}$ and a read/write request to the bus controller 71 of the control circuit 12 through signal lines 101 and 102, respectively. When the read/write request designates a data read, the R/$\overline{W}$ signal generator 76 of the bus controller 71 keeps the read/write signal R/$\overline{W}$ at a high-level (hereafter simply referred to as H-level), as shown in FIG. 4(B). Simultaneously, the operation unit 10 outputs an address relating to requesting data (one word) to the address bus interface circuit 72 through an address bus 105, as shown in FIG. 4(A).

As shown in FIG. 4(H), in response to the block access request, the L/$\overline{C}$ signal generator 77 sends the load/count signal L/$\overline{C}$ signal at the H-level to the address counter 85 of the address bus interface circuit 82 to instruct the bus slave 14 to load the address. Accordingly, 2 low-order bits of the address are latched in the latch part of the counter 85, and the 30 remaining bits are inputted into the address buffer 84. These operations are controlled by the load/count signal L/$\overline{C}$ and the bus clock BCLK. Next, as shown in FIG. 4(C), the $\overline{AS}$ signal generator 78 sends the address strobe signal $\overline{AS}$ at a low level (hereafter simply referred to as L-level) to the memory read/write controller 87 in the bus slave 14, in order to indicate that the address is defined.

Further, as shown in FIG. 4(E), the $\overline{BLOCK}$ generator 73 outputs the block access request signal $\overline{BLOCK}$ at the L-level to the memory read/write controller 87, in response to a block access request from the operation unit 10 passed through a signal line 103. In addition, the block access request signal $\overline{BLOCK}$ is also fed to the block access execution discriminating circuit 74 through a signal line 108. Subsequently, as shown in FIG. 4(D), the $\overline{DS}$ signal generator 79 feeds the data strobe signal $\overline{DS}$ at the L-level to the memory read/write controller 87 to request the latch of the transferred data to the bus slave 14. Thereafter, the control circuit 12 waits until receiving the send completion signal $\overline{SDC}$ (a change into the L-level) sent from the access response circuit 88 in the control circuit 15 of the bus slave 14 by inserting a wait cycle W into an operating cycle of the operation unit 10, as shown in FIG. 4A. In the illustrated time chart, *1 and *2 denote check operations for the signal $\overline{SDC}$ by the control circuit 12. The wait cycle W is necessary to compensate a time delay of signals in the control circuit 15 of the bus slave 14.

On the other hand, the decoder 83 in the bus slave 14 decodes the 30 high-order bits of the address, and checks whether or not the block access is possible for a memory region designated by the address from the bus master 11. It is noted that in general, information indicating whether or not the block access is acceptable for the accessed memory region may be found from high-order bits of an address. Then, the decoder 83 provides the access response circuit 88 with a decoded result through a signal line 110. When the block access is acceptable, as shown in FIG. 4(F), the access response circuit 88 switches the block access acknowledge signal $\overline{BLACK}$ to the L-level, and inform the bus master 11 of the acceptance of the requested block access. In FIG. 4(G), a hatched part denotes an undefined state.

Along with the above operation, both the 30 high-order address bits and the 2 remaining address bits which are latched by the counter 85 are supplied to the memory unit 16 through the address buffer 84. The memory read/write controller 87 reads first one word #0 (amounting to 32 bits) included in the designated block, and supplies the data buffer 80 with the one word #0. When this transfer is completed, the memory read/write controller 87 informs the access response circuit 88 of the completion. In response to this information, the access response circuit 88 sends the send completion signal $\overline{SDC}$ at the L-level to the control circuit 12 of the bus master 11. Then, the one word #0 is sent to the bus master 11, as shown in FIG. 4(J) in synchronization with the bus clock BCLK shown in FIG. 4(I) which is sent from the bus master 11.

Figure 28:
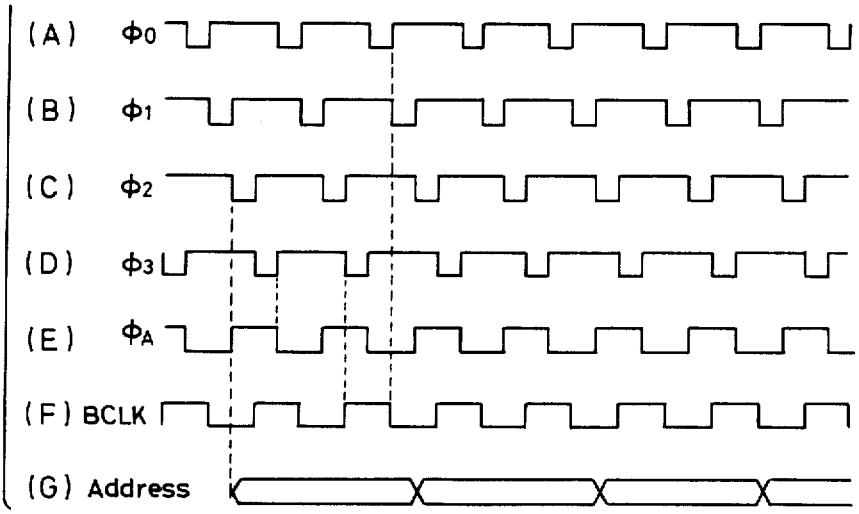
FIGS. 28(A) through 28(G) show various clock signals and an address signal.

When the block access execution discriminating circuit 74 detects both the send completion signal $\overline{SDC}$ and the block access acknowledge signal $\overline{BLACK}$, it supplies the bus controller 71 through a signal line 106 with a signal indicating that the requested block access is acceptable. This signal may be produced by use of a block access cancel signal $\overline{BLACAN}$, described in detail later. That is, no block access cancel signal $\overline{BLACAN}$ is produced, the signal indicating that the block access request is executed is produced. Then, the bus controller 71 supplies, through a signal line 107, the data latch circuit 75 with a clock signal $\phi_0$ which is in synchronization with the bus clock signal BCLK, as shown in FIGS. 28(A) and 28(F). The one word #0 received by the data latch circuit 75 is sampled in response to a trailing edge of the clock signal $\phi_0$. The sampled data of the word #0 is inputted into the cache memory 13.

After the one word #0 is sent to the bus master 11, the address counter 85 of the control circuit 15 increments the 2 low-order bits of the address supplied from the address bus interface circuit 72, by using the bus clock signal BCLK which is delivered from the bus master 11. The incremented address bits are supplied to the memory unit 16 together with the address bits stored in the address buffer 84 by the control of the memory read/write controller 87. Then, as shown in FIG. 4(J), the next one word #1 subsequent to the word #0 is read out, and sent to the data latch circuit 75 of the bus master 11 through the data buffer 80 in synchronization with the bus clock signal BCLK. In this manner, the remaining words #2 and #3 are successively supplied to the cache memory 13.

When the transfer of one block is completed, the block access execution discriminating circuit 74 provides the $\overline{BLOCK}$ signal generator 73 through a signal line 109 with a signal indicating release of the block access request signal $\overline{BLOCK}$ (which is a cache-in end signal $\overline{CAINEND}$, as described later). In response to this signal, as shown in FIG. 4(E), the block access request signal $\overline{BLOCK}$ is released by switching to the H-level. Then, the cache-in operation in accordance with the block access is completed.

As described above, in the case where the memory or memory region of the access time shorter than the operating cycle of the operation unit 10 is subjected to the block access, subsequent to the first one word #0, the consecutive three words #1, #2 and #3 are sequentially transferred from the memory unit 16 into the cache memory 13 in accordance with three consecutive cycles of the bus clock signal BCLK within one bus cycle.

In the above operation, the control circuit 12 inserts the wait cycle W until the send completion signal $\overline{SDC}$ is generated. FIGS. 5(A) through 5(J) show operating time charts of the above system where no wait cycle W is inserted. Operations shown in FIGS. 5(A) through 5(J) are the same as those shown in FIGS. 4(A) through 4(J) except for the insert of the wait cycle W. As shown, the send completion signal $\overline{SDC}$ is generated immediately after the data strobe signal $\overline{DS}$ is switched to the L-level.

A description will be given on the embodiment shown in FIGS. 1 through 3 at the time when data is transferred from the memory of the long access time such as the D-RAM, by referring to FIGS. 6(A) through 6(J).

Figure 6:
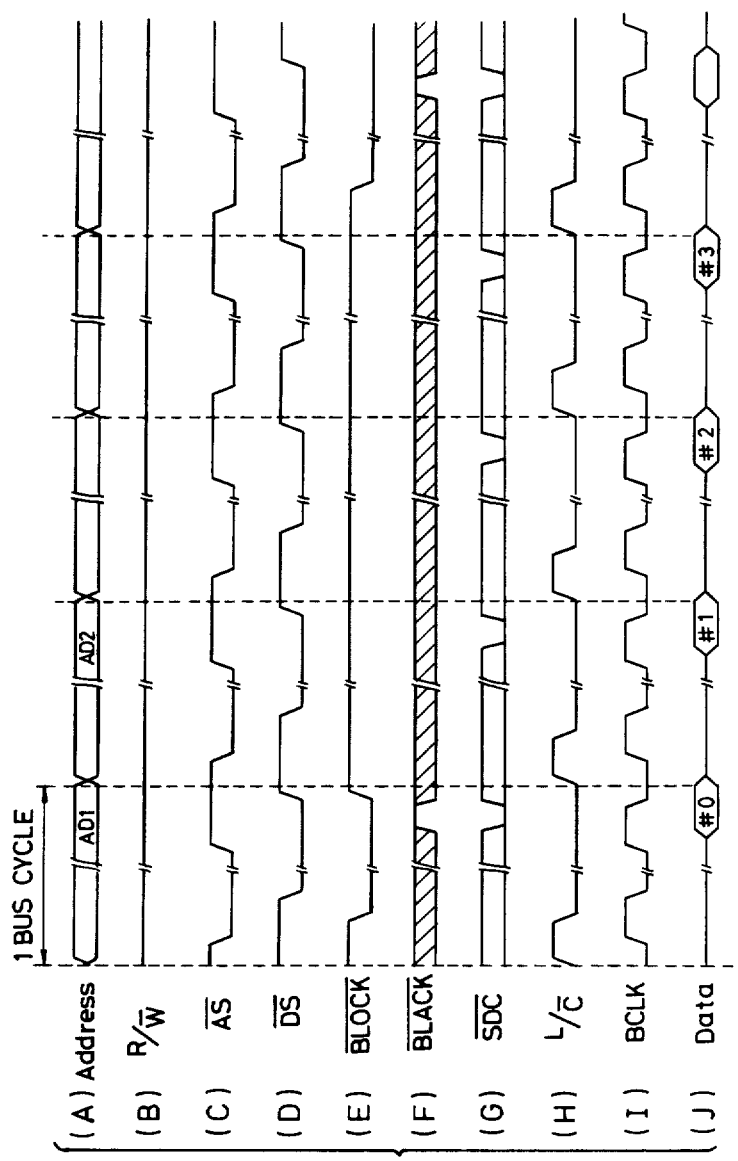
FIGS. 6(A) through 6(J) are operating time charts of the embodiment shown in FIG. 1 where the block access is cancelled by a bus slave.

In response to the access request $\overline{ACRQ}$ from the operation unit 10, the control circuit 12 of the bus master 11 sequentially produces the read/write signal R/$\overline{W}$ (FIG. 6(B)), the address (FIG. 6(A)), the load/count signal L/$\overline{C}$ (FIG. 6.(H)), the address strobe signal $\overline{AS}$ (FIG. 6(C)), the block access request signal $\overline{BLOCK}$ (FIG. 6(E)), and the data strobe signal $\overline{DS}$ (FIG. 6(D)). The above operation is the same as the operation for the memory of the short access time described before.

The memory read/write controller 87 shown in FIG. 3 addresses the memory unit 16 with the address provided from the address buffer 84, and reads out one word #0 composed of 32 bits which is the first word in the requested block. The read-out word #0 is sent to the bus master 11 through the data buffer 80 and the data bus 17b, as shown in FIG. 6(J). Simultaneously, as shown in FIG. 6(G), the access response circuit 88 sends the send completion signal $\overline{SDC}$ at the L-level to the control circuit of the bus master 11.

It should be noted that the access response circuit 88 does not output the block access acknowledge signal $\overline{BLACK}$ to the bus master 11, as shown in FIG. 6(F). That is, the block access acknowledge signal $\overline{BLACK}$ is kept at the H-level. The H-level of the block access acknowledge signal $\overline{BLACK}$ indicates that the bus slave 14 cancels the requested block access. At this time, the access response circuit 81 prevents the counting function of the address counter 85.

When the block access execution discriminating circuit 74 finds only the send completion signal $\overline{SDC}$, it supplies the $\overline{BLOCK}$ signal generator 73 through the signal line 109 with a signal indicating the block access signal is cancelled by the bus slave 14. This signal is the block access cancel signal $\overline{BLACAN}$ described in detail later. Then, the $\overline{BLOCK}$ signal generator 73 releases the block access request signal $\overline{BLOCK}$ by switching it into the H-level, as shown in FIG. 6(E), so that the bus master 11 informs the bus slave 14 that the data transfer in accordance with the block access is not performed. During the above operation, the one word #0 at the data latch circuit 75 is sampled by the clock signal $\phi_0$, and stored into the cache memory 13.

In the above operation, it is assumed that the wait cycle corresponding to three cycles of the bus clock signal BCLK is inserted into the operating cycle, and that the access time for the accessed memory (memory region) is long, in the order of more than two cycles of the bus clock signal BCLK. Under this condition, it takes more than five cycles of the bus clock signal BCLK for this signal to be transferred to the cache memory 13.

After that, the incrementer 22 of the address bus interface circuit 72 increments the address (AD1) which has been sent to the bus slave 14. The incremented address (AD2) is supplied to the control circuit 15 of the bus slave 14, as shown in FIG. 6(A). Then, one word #1 following the word #0 which was sent during the preceding bus cycle is read out from the memory unit 16, and sent to the bus master 11, as shown in FIG. 6(J). That is, starting with the bus cycle subsequent to the bus cycle during which the word #0 is tranferred, the control circuit 12 of the bus master 11 sequentially increments the address and reads out words #1, #2 and #3 in accordance with a general access sequence. The general access sequence is carried out so that the transfer of one data (word) is carried out for one address supplied by the bus master 11.

In this manner, the cache-in operation is made in accordance with the general access sequence with respect to the memory of the access time longer than the operating cycle of the operation unit 10.

FIG. 7A shows a relationship between a block and a word. Data are divided into blocks for every four words. As shown, a block #0 consists of four consecutive words #0 to #3. Likewise, a block #1 consists of four consecutive words #4 to #7. Addresses respectively provided for the words #0 to #3 are successive address. Likewise, addresses respectively provided for the words #4 to #7 are also successive addresses.

FIG. 7B shows a head word which is requested by the operation unit 10 and a transfer sequence of words subsequent to the requested word. When a word shown in the left-hand side columns is requested, the following words are transferred in a sequence shown in the right-hand side column. In the previous example, it is assumed that the word requested by the operation unit 10 is the word #0 in the block #0.

A description will be given on a detailed configuration of the address bus interface circuit 72 shown in FIG. 2, by referring to FIGS. 8 through 12.

Figure 8:
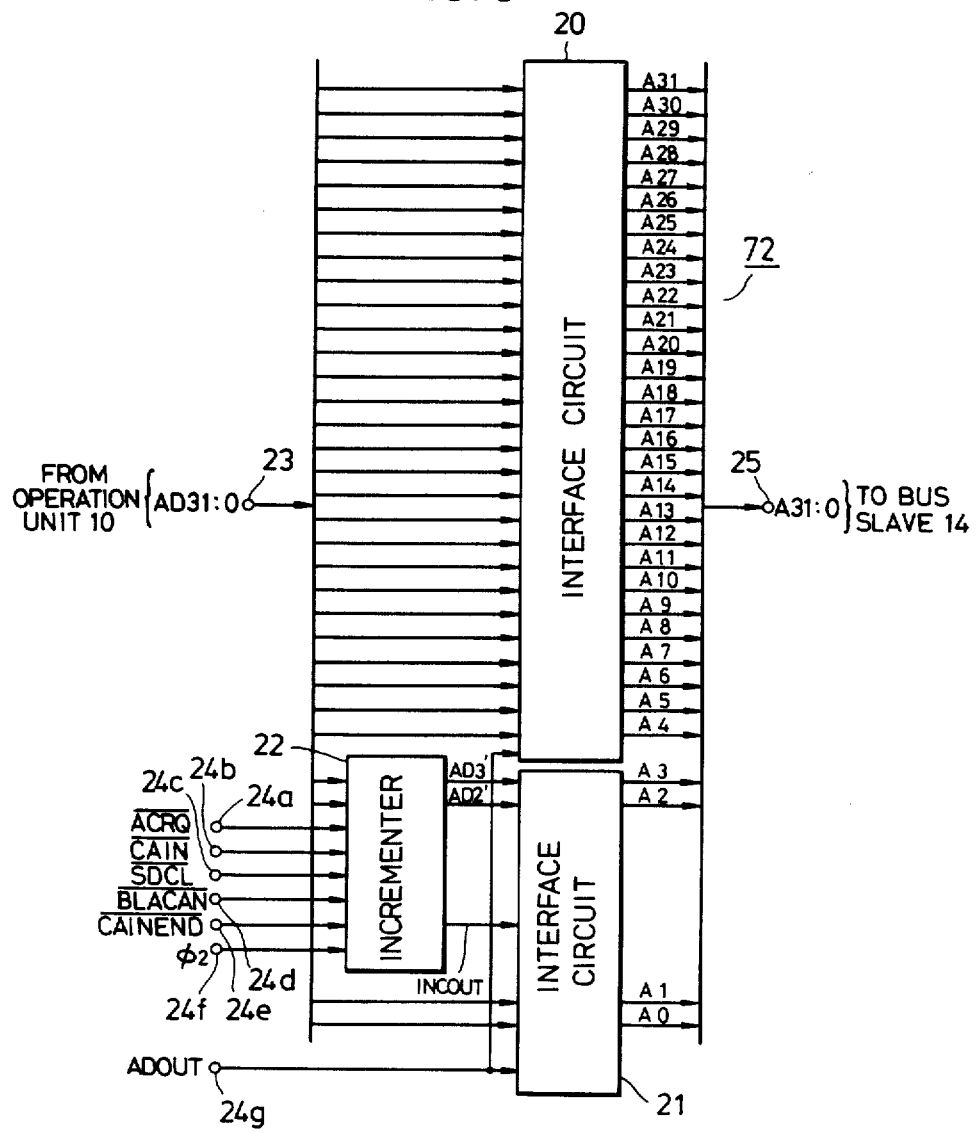
FIG. 8 is a circuit diagram of an address bus interface circuit shown in FIG. 2.

FIG. 8 is a block diagram of the address bus interface circuit 72. As shown, the address bus interface circuit 72 comprises two interface circuits 20 and 21 and the incrementer 22. A terminal 23 is provided with an address AD31:0 to 32 bits. Terminals 24a through 24g are respectively provided with the access request $\overline{ACRQ}$ from the operation unit 10, a cache-in signal $\overline{CAIN}$, a sampled send completion signal $\overline{SDCL}$, a block access cancel signal $\overline{BLACAN}$, a cache-in end signal $\overline{CAINEND}$ signal, a clock signal $\phi_2$, and an address-out signal ADOUT. The cache-in signal $\overline{CAIN}$ is kept at the L-level (outputted) while the operation unit 10 instructs the block access. The sampled send completion signal $\overline{SDCL}$ is a signal obtained by sampling the send completion signal $\overline{SDC}$. The block access cancel signal $\overline{BLACAN}$ indicates the cancel of the block access when it is kept at the L-level. The cache-in end signal $\overline{CAINEND}$ indicates the completion of the transfer of one block. The address-out signal ADOUT instructs latch of the address of the interface circuit 20. Signal lines for the cache-in signal $\overline{CAIN}$ and the address-out signal ADOUT are omitted in FIG. 2 for simplicity. The address A31:0 made by the address bus interface circuit of FIG. 8 is outputted to the address bus 17a through a terminal 25.

FIGS. 28(A) through 28(G) show various timing signals used in the following description. These timing signals may be made by a timing generator (not shown) which is provided in the microprocessor 100, for example.

Figure 9:
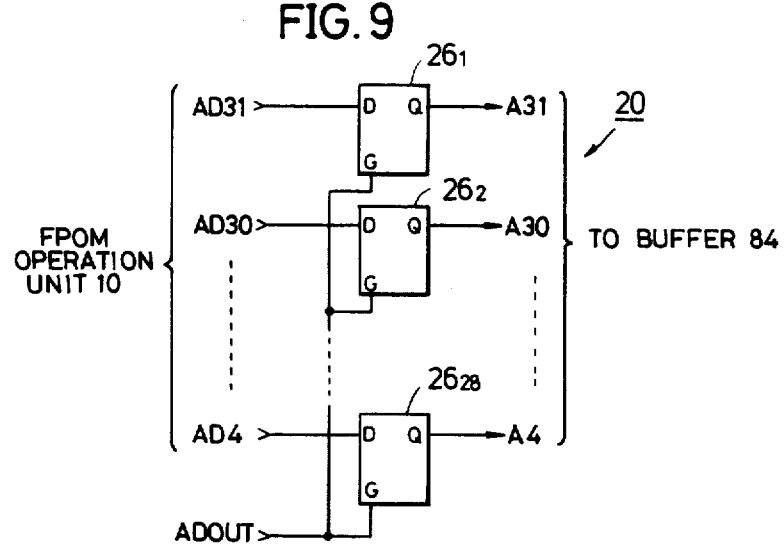
FIG. 9 is a circuit diagram of an interface circuit provided in the address bus interface circuit of FIG. 8.

The interface circuit 20 is constituted as shown in FIG. 9. The interface circuit 20 consists of D-type flip-flops $26_1$ through $26_{28}$ relating to the address bits AD31 through AD4, respectively. The flip-flops $26_1$ through $26_{28}$ latch the respective address bits by application of 28 high-order bits of the address-out signal ADOUT. The latched address bits are outputted as 28 high-order bits of the address A31:0.

Figure 10:
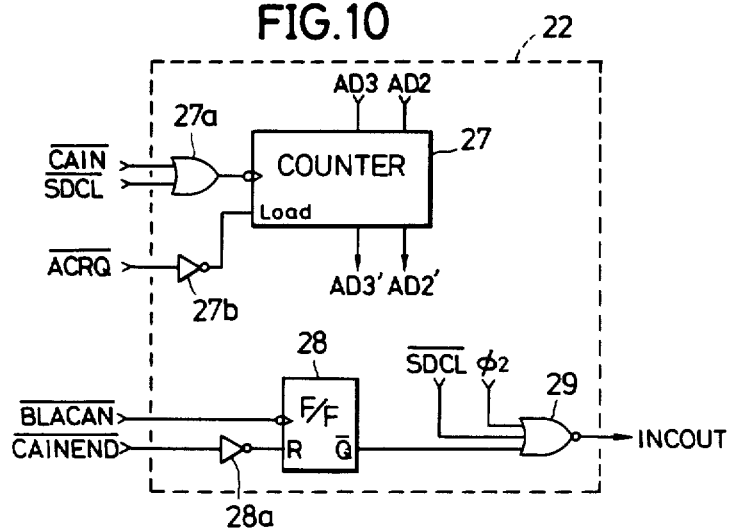
FIG. 10 is an address incrementer provided in the address bus interface circuit of FIG. 8.
Figure 11:
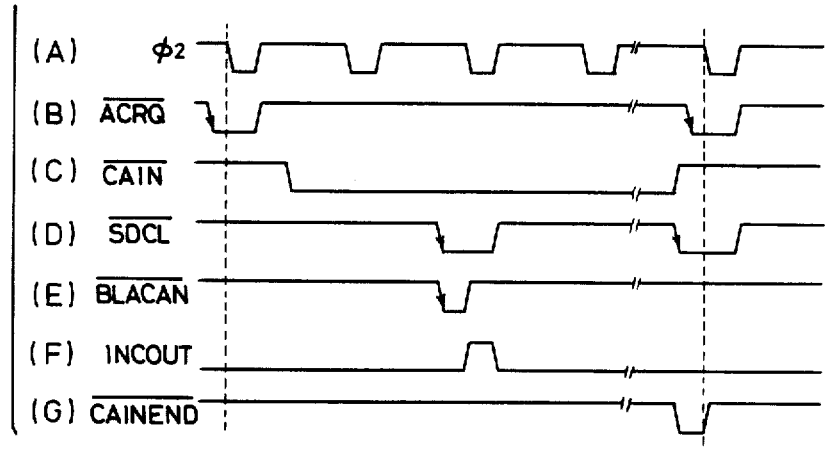
FIGS. 11(A) through 11(G) show signal waveforms for explaining an operation of the address incrementer of FIG. 10.

The address incrementer 22 is constituted as shown in FIG. 10. A 2-bit counter 27 loads bits AD3 and AD2 of the address AD31:0 through an OR circuit 27a, when the access request signal $\overline{ACRQ}$ shown in FIG. 11(B) is supplied thereto through an inverter 27b. Thereafter, the 2-bit counter 27 performs a count-up operation, when both the cache-in signal $\overline{CAIN}$ and the sampled send completion signal $\overline{SDCL}$ shown in FIG. 11(D) are switched into the L-level. Then, the 2-bit counter 27 outputs address bits AD3' and AD2', respectively.

The address incrementer 22 further comprises a flip-flop 28. The flip-flop 28 is set by the block access cancel signal $\overline{BLACAN}$ shown in FIG. 11(E) which is generated when the block access is cancelled by the control circuit 15 of the bus slave 14, and is reset by the cache-in end signal $\overline{CAINEND}$ signal shown in FIG. 11(G) which is produced at the time when the access for one block is completed and which is passed through an inverter 28a. The signals $\overline{BLACAN}$ and $\overline{CAINEND}$ are supplied to the incrementer 22 via the signal line 106, the bus controller 71 and the signal line 104. A Q-output of the flip-flop 28, the sampled send completion signal $\overline{SDCL}$ and the clock signal $\phi_2$ shown in FIGS. 11(A) and FIG. 28(C) are supplied to an NOR circuit 29. The NOR circuit 29 generates an increment-out signal INCOUT shown in FIG. 11(F), when the control circuit 15 of the bus slave 14 cancels the block access request from the bus master 11.

Figure 12:
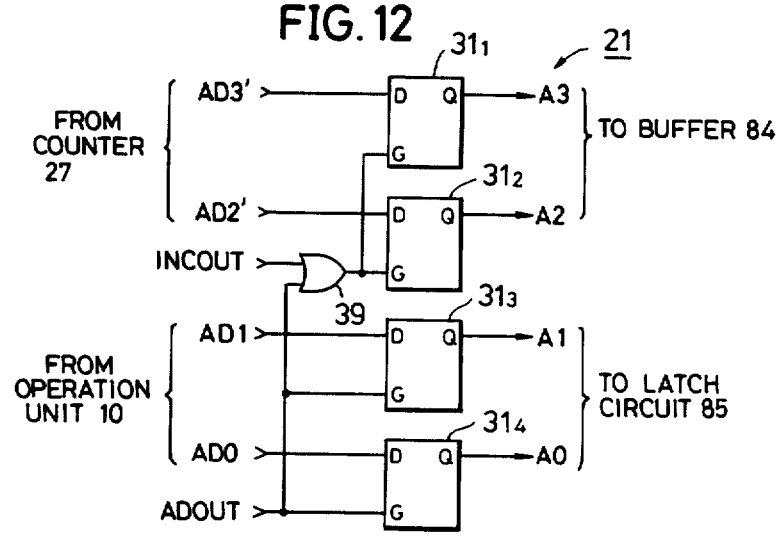
FIG. 12 is a circuit diagram of another interface circuit provided in the address bus interface circuit shown in FIG. 8.

FIG. 12 shows a circuit structure of the interface circuit 21 shown in FIGS. 8. Latch circuits $31_1$ and $31_2$ formed by D-type flip-flops are provided with the address bits AD3' and AD2' from the counter 27 shown in FIG. 10. The latch circuits $31_1$ and $31_2$ latch the address bits AD3' and AD2' at the incoming time of the address-out signal ADOUT and the increment-out signal INCOUT which are passed through an OR circuit 39. Then, the latched address bits AD3' and AD2' are outputted as address bits A3 and A2 of the address A31:0, respectively. The interface circuit 21 further comprises latch circuits $31_3$ and $31_4$, which are provided with the address bits AD1 and AD0, respectively. Then, the latch circuits $31_3$ and $31_4$ latch the address bits AD1 and AD0, respectively at the incoming time of the address-out signal ADOUT. Then, the latched bits AD1 and AD0 are outputted as address bits A1 and A0, respectively.

The address A31:0 for obtaining access to the memory unit 16 is provided for every bite unit. As described before, the block access is carried out per word unit (corresponding to 4 bites). Therefore, the address bits AD3 and AD2 are incremented when the block access is cancelled by the control circuit 15 of the bus slave 14.

Figure 13:
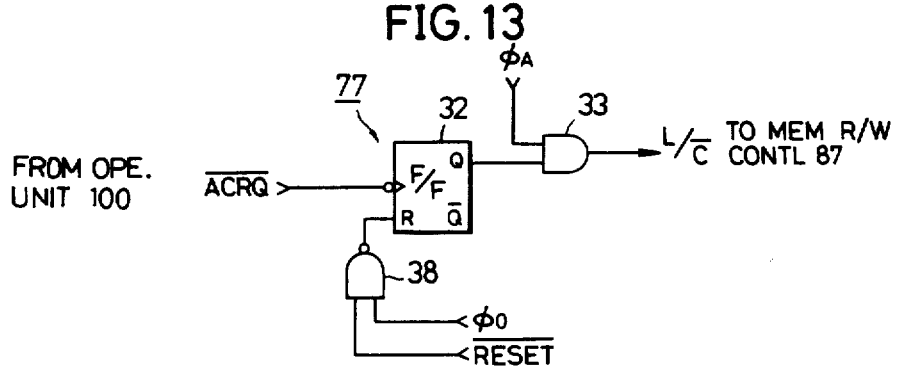
FIG. 13 is a circuit diagram of a load/count signal generator shown in FIG. 2.
Figure 14:
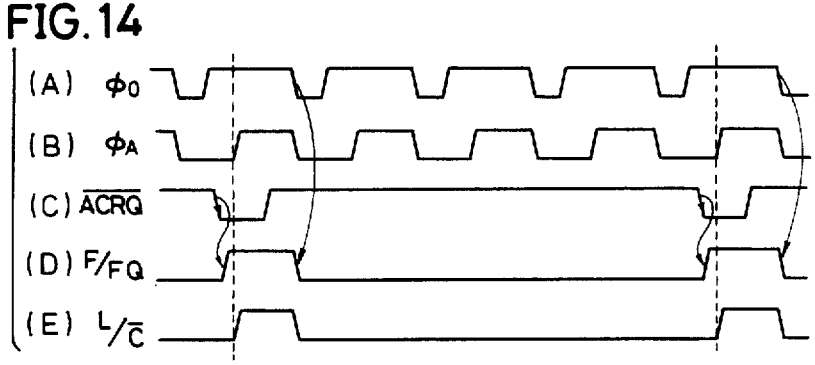
FIGS. 14(A) through 14(E) shows signal waveforms at the load/count signal generator of FIG. 13.

FIG. 13 is a circuit diagram of the load/count (L/$\overline{C}$) signal generator 77 shown in FIG. 2. The L/$\overline{C}$ signal generator 77 consists of a flip-flop 32, an AND circuit 33 and a NAND circuit 38. The flip-flop 32 is reset by a reset signal $\overline{RESET}$ supplied to the operation unit 10 through the NAND circuit 38 (a signal line for the $\overline{RESET}$ is not shown in FIG. 2), and is set by the access request signal $\overline{ACRQ}$ shown in FIG. 14(C) from the operation unit 10. Thereafter, the flip-flop 32 is reset by the clock signal $\phi_0$ at the L-level shown in FIGS. 14(A) and 28(A), and forms a Q-output signal shown in FIG. 14(D). The Q-output signal is subjected to the AND logic operation with a clock signal $\phi_4$, so that the load/-count signal L/$\overline{C}$ having a predetermined pulse width is produced as shown in FIG. 14(E).

Figure 15:
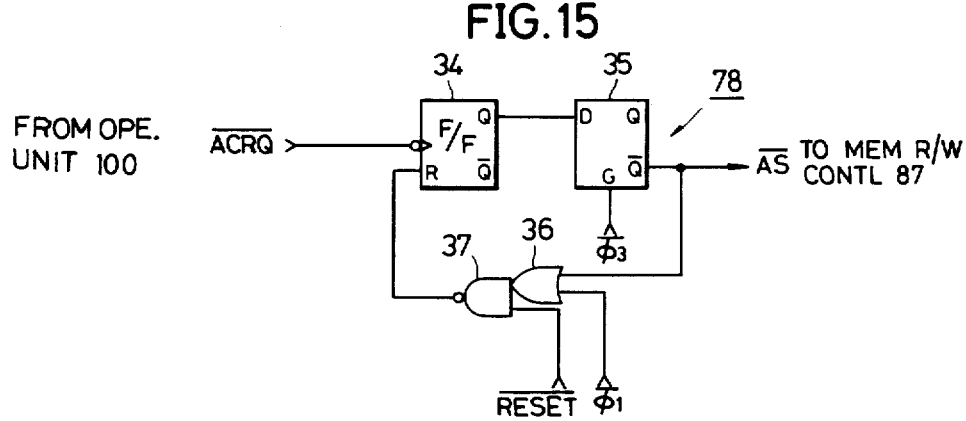
FIG. 15 is a circuit diagram of an address strobe signal generator shown in FIG. 2.
Figure 16:
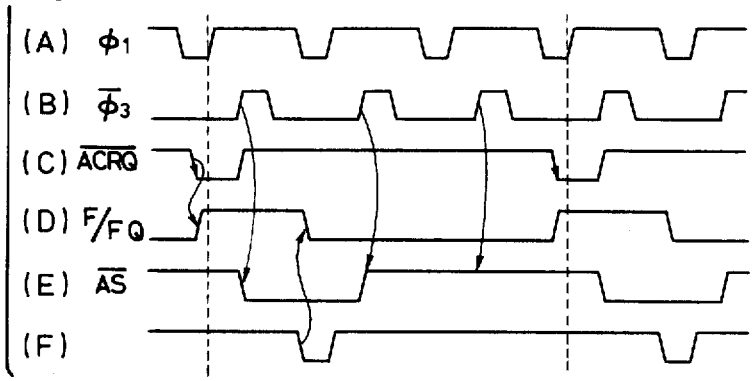
FIGS. 16(A) through 16(F) show signal waveforms at the address strobe signal generator shown in FIG. 15.

The address strobe signal ($\overline{AS}$) generator 78 shown in FIG. 2 is constituted as shown in FIG. 15. As illustrated, the $\overline{AS}$ signal generator 78 comprises a flip-flop 34, a latch circuit 35 of a D-type flip-flop, an OR circuit 36 and a NAND circuit 37. The flip-flop 34 is reset by the reset signal $\overline{RESET}$ passed through the NAND circuit 37. Subsequently, the flip-flop 34 is set by the access request signal $\overline{ACRQ}$ from the operation unit 10 as shown in FIG. 16(C). Thereafter, the flip-flop 37 is reset by a signal shown in FIG. 16(F) passed through the NAND circuit 37, and produces the Q-output shown in FIG. 16(D). The Q-output of the flip-flop 34 is latched by the latch circuit 35 in response to a clock signal $\phi_3$ shown in FIGS. 16(B), which is an inverse signal of the clock signal $\phi_3$ shown in FIG. 28(D). Then, the address strobe signal $\overline{AS}$ shown in FIG. 16(E) is extracted from a $\overline{Q}$-output of the latch circuit 35. The OR circuit 36 carries out the OR operation for the address strobe signal $\overline{AS}$ and an inverse signal $\phi_0$ of the clock signal $\phi_0$ shown in FIG. 16(A). The output signal of the OR circuit 36 is inverted by the NAND circuit 37, so that the signal shown in FIG. 16(F) is produced.

Figure 17:
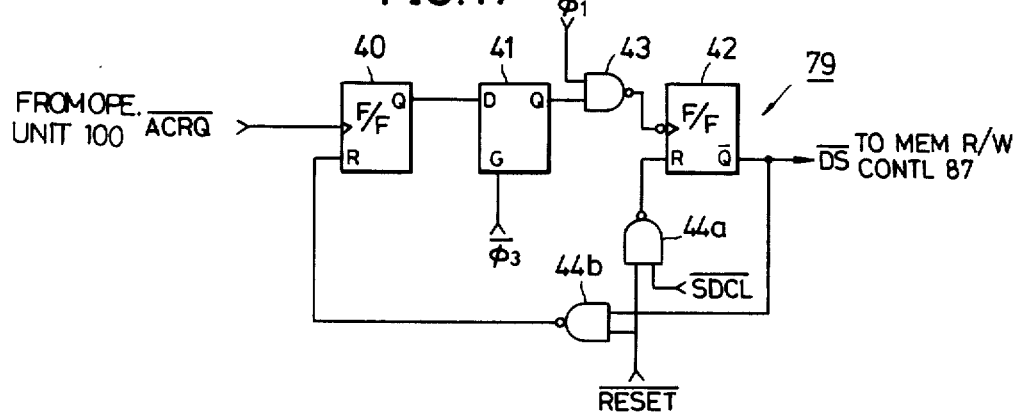
FIG. 17 is a circuit diagram of a data strobe signal generator shown in FIG. 2.
Figure 18:
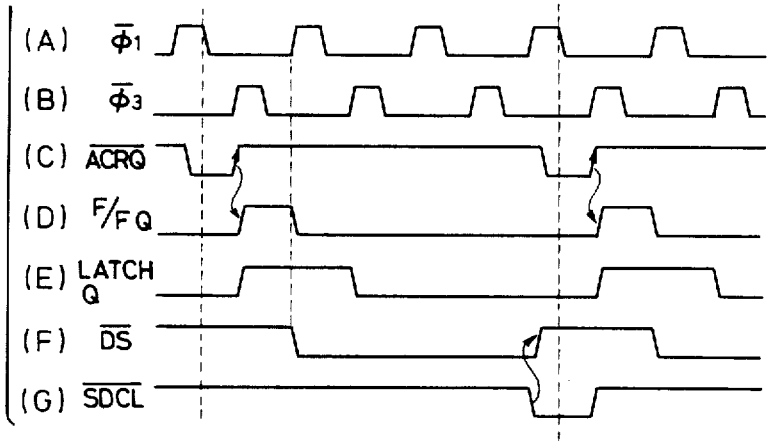
FIGS. 18(A) through 18(G) show signal waveforms at the data strobe signal generator of FIG.:17.

FIG. 17 is a circuit diagram of the data strobe ($\overline{DS}$) signal generator 79 shown in FIG. 2. Referring to this figure, a flip-flop 40 is reset by the reset signal $\overline{RESET}$, and is thereafter set by the access request signal $\overline{ACRQ}$ shown in FIG. 18(C), so that a Q-output of a latch circuit 41 shown in FIG. 18(D) is produced. In response to the clock signal $\phi_3$ shown in FIG. 18(B), the latch circuit 41 latches the Q-output of the flip-flop 40, and thus produces a signal shown in FIG. 18(E) at the Q-terminal thereof.

A flip-flop 42 is reset by the reset signal $\overline{RESET}$ or the sampled send completion $\overline{SDCL}$ shown in FIG. 18(G), both of which are passed through a NAND circuit 44a. Thereafter, the flip-flop 42 is set by an output signal of a NAND circuit 43 which is synchronized with the clock signal $\phi_1$. In this manner, the flip-flop 42 generates the data strobe signal $\overline{DS}$ shown in FIG. 18(F). The data strobe signal $\overline{DS}$ is fed to the flip-flop 40, so that it is reset.

Figure 19:
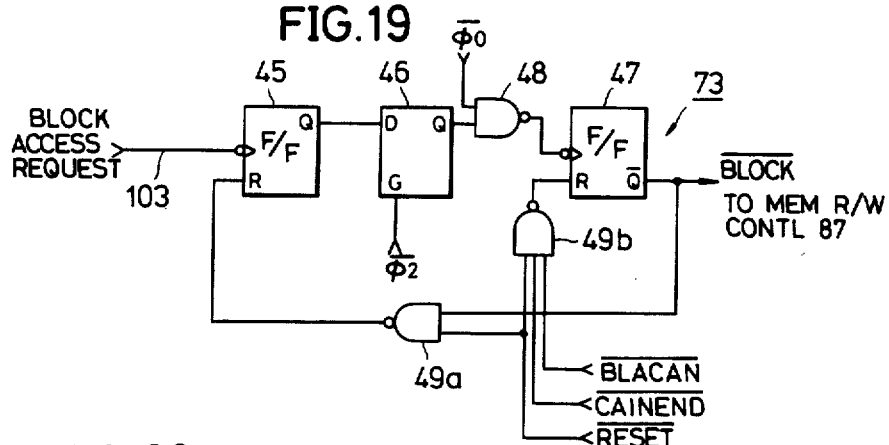
FIG. 19 is a circuit diagram of a block access request signal generator shown in FIG. 2.
Figure 20:
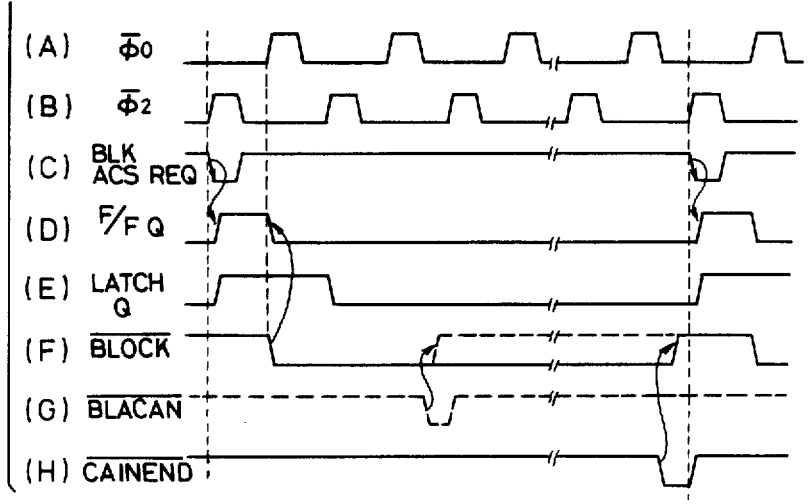
FIGS. 20(A) through 20(H) show signal waveforms at the block access request generator shown in FIG. 19.

FIG. 19 is a circuit diagram of the block access request ($\overline{BLOCK}$) signal generator 73 shown in FIG. 2. A flip-flop 45 is reset by the reset signal $\overline{RESET}$. Thereafter, the flip-flop 45 is set by the block access request shown in FIG. 20(C) which is derived from the bus controller 71 passed through the signal line 103 shown in FIG. 2, so that a Q-output signal shown in FIG. 20(D) is produced. A latch circuit 46 of a D-type flip-flop latches the Q-output of the flip-flop 45 by using the clock signal $\phi_2$ shown in FIG. 20(B), and produces a Q-output shown in FIG. 20(E).

A flip-flop 47 is reset at the time of input of the reset signal $\overline{RESET}$, the block access cancel signal $\overline{BLACAN}$ or the cache-in end signal $\overline{CAINEND}$ respectively shown in FIGS. 20(G) and 20(H) which are passed through a NAND circuit 49b. Thereafter, the flip-flop 47 is set at the time of input of an output signal of a NAND circuit 48 which is synchronized with the clock signal $\phi_0$ shown in FIG. 20(A). In this way, the block access request signal $\overline{BLOCK}$ shown in FIG. 20(F) is produced at a Q-terminal of the flip-flop 47. The block access request signal $\overline{BLOCK}$ is supplied to the flip-flop 45 through a NAND circuit 49a, so that it is reset.

Figure 21:
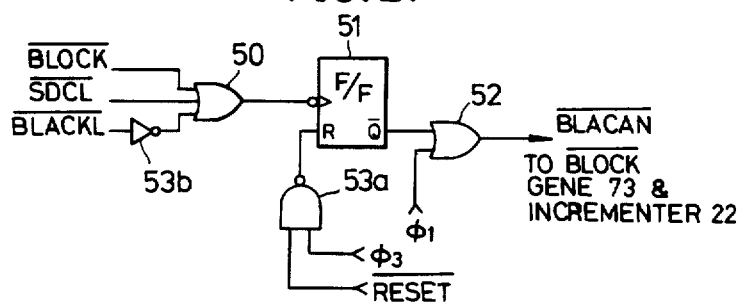
FIG. 21 is a circuit diagram of a block access cancel signal generator which is a structural part of a block access execution discriminating circuit shown in FIG. 2.

The block access cancel signal $\overline{BLACAN}$ is produced by a block access cancel signal generator (hereafter simply referred to as $\overline{BLACAN}$ signal generator) shown in FIG. 21. The illustrated $\overline{BLACAN}$ signal generator is contained in the block access execution discriminating circuit 74 shown in FIG. 2. Referring to FIG. 21, an OR circuit 50 is provided with the block access request signal $\overline{BLOCK}$, the sampled send completion signal $\overline{SDCL}$ and a signal $\overline{BLACKL}$ which is supplied thereto through an inverter 53b, shown in FIGS. 22(C), 22(D) and 22(E), respectively. The block access request signal $\overline{BLOCK}$ is supplied from the block signal generator 73 through the signal line 108 shown in FIG. 2. The sampled send completion signal $\overline{SDCL}$ is provided by sampling the send completion signal $\overline{SDC}$ from the access response circuit 88 in the bus slave 14. The signal $\overline{BLACKL}$ is obtained by sampling the block access acknowledge signal $\overline{BLACK}$ sent from the access response circuit 88. In response to the above signals, the OR circuit produces an output signal shown in FIG. 22(F).

Figure 22:
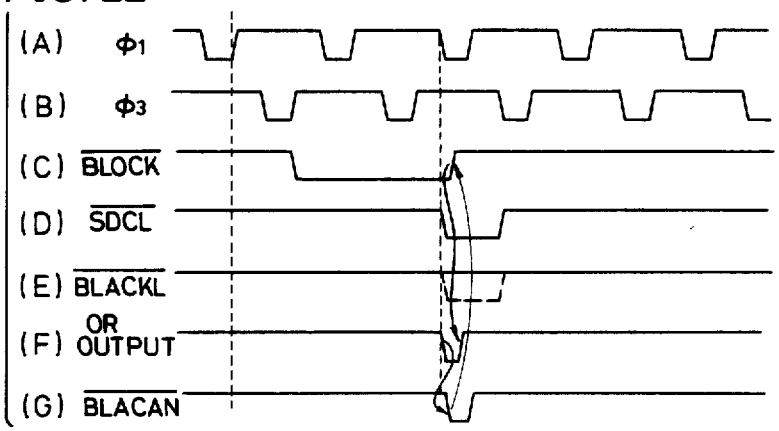
FIGS. 22(A) through 22(G) show signal waveforms at the block access cancel signal generator of FIG. 21.

A flip-flop 51 is reset by the reset signal $\overline{RESET}$ or the clock signal $\phi_3$ shown in FIG. 22(B), and is set by the output signal of the OR circuit 50. These signals are passed through a NAND circuit 53a and are fed to the flip-flop 51. An Q-output of the flip-flop 51 is subjected to the OR logic operation with the clock signal $\phi_1$ in FIG. 22(A) at an OR circuit 52. Then, the block access cancel signal $\overline{BLACAN}$ shown in FIG. 22(G) is produced at the output of the OR circuit 52.

Figure 23:
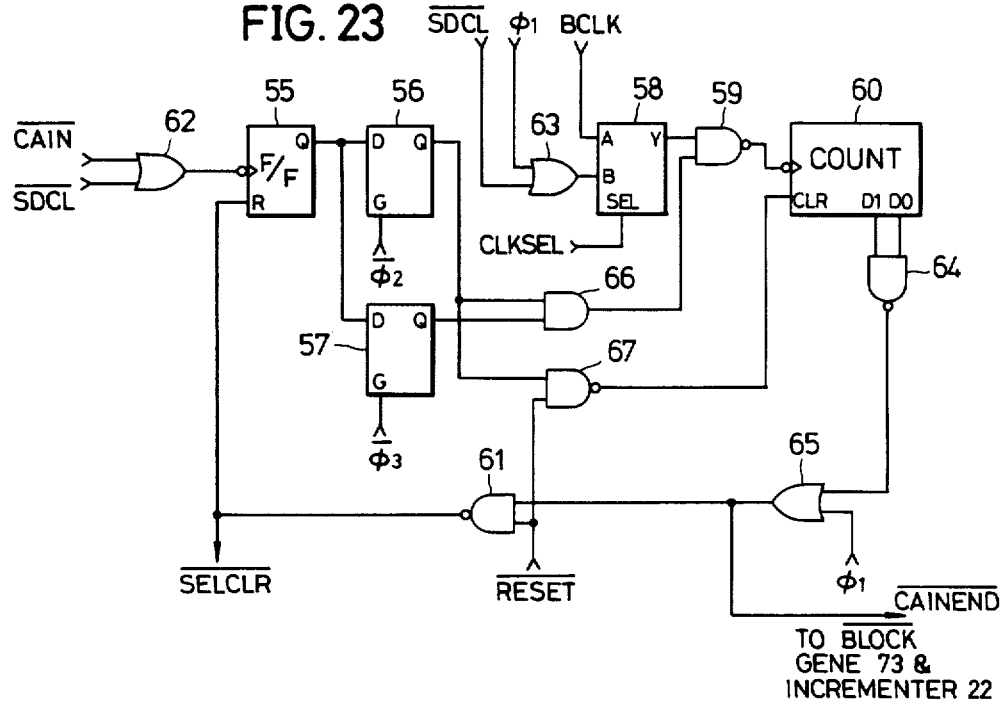
FIG. 23 is a circuit diagram of a cache-in end signal generator which is a structural part of the block access execution discriminating circuit shown in FIG. 2.

The cache-in end signal CAINEND/ is produced by a cache-in end signal generator (hereafter simply referred to as $\overline{CAINEND}$ signal generator) shown in FIG. 23. The $\overline{CAINEND}$ signal generator illustrated is contained in the block access execution discriminating circuit 74 shown in FIG. 2 together with the $\overline{BLACAN}$ signal generator shown in FIG. 21.

FIGS. 24(A) through 24(K) show signal waveforms at parts of the circuit shown in FIG. 23 when the block access is possible and is executed. FIGS. 25(A) through 25(J) show signal waveforms at different parts of the circuit shown in FIG. 23 when the block access is cancelled.

A flip-flop 55 shown in FIG. 23 is reset by the reset signal $\overline{RESET}$ or a select clear signal $\overline{SELCLR}$ which will be described later. The flip-flop 55 is provided with the cache-in signal $\overline{CAIN}$ of FIGS. 24(D) and 25(D) and the sampled send completion signal $\overline{SDCL}$ of FIGS. 24(E) and 25(E) passed through an OR circuit 62. Thus, when both of these signals are at the L-level, the flip-flop 55 is set. Latch circuits 56 and 57 latch the Q-output of the flip-flop 55 in response to the clock signal $\phi_2$ shown in FIGS. 24(B) and 25(B) and the clock signal $\phi_3$ shown in FIGS. 24(C) and 25(C), respectively. Accordingly the Q-output of the latch circuit 56 is switched into the H-level as shown in FIGS. 24(F) and 25(F), and the Q-output of the latch circuit 57 is also switched into the H-level as shown in FIGS. 24(G) and 25(G).

Figure 24:
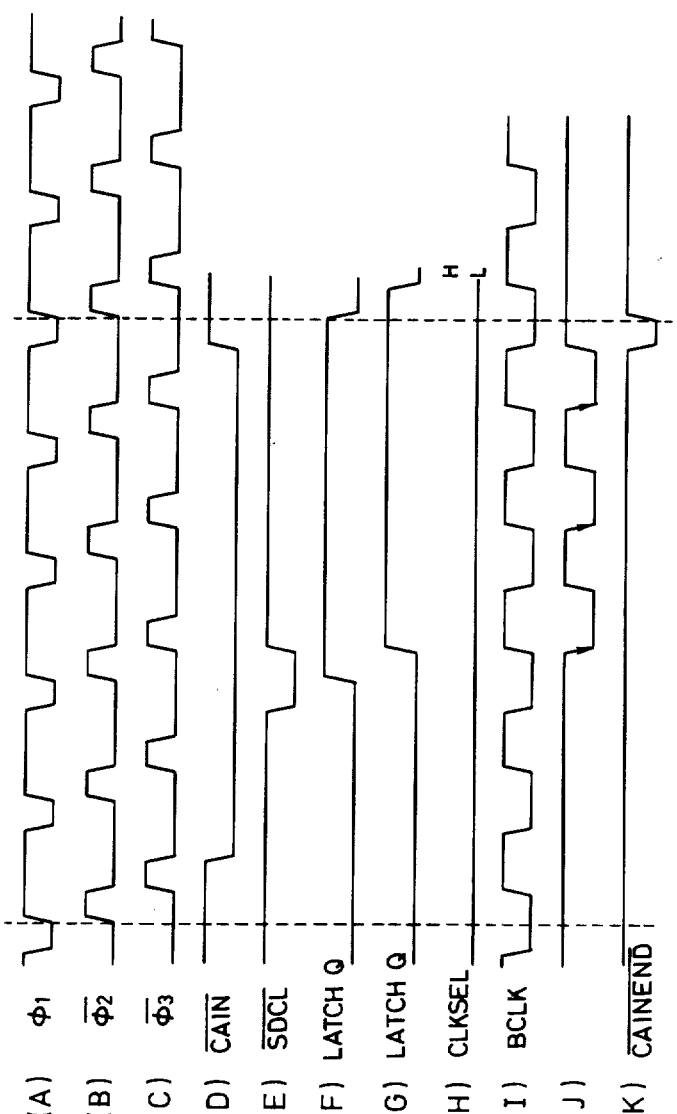
FIGS. 24(A) through 24(K) show signal waveforms at the cache-in end signal generator of FIG. 23.
Figure 25:
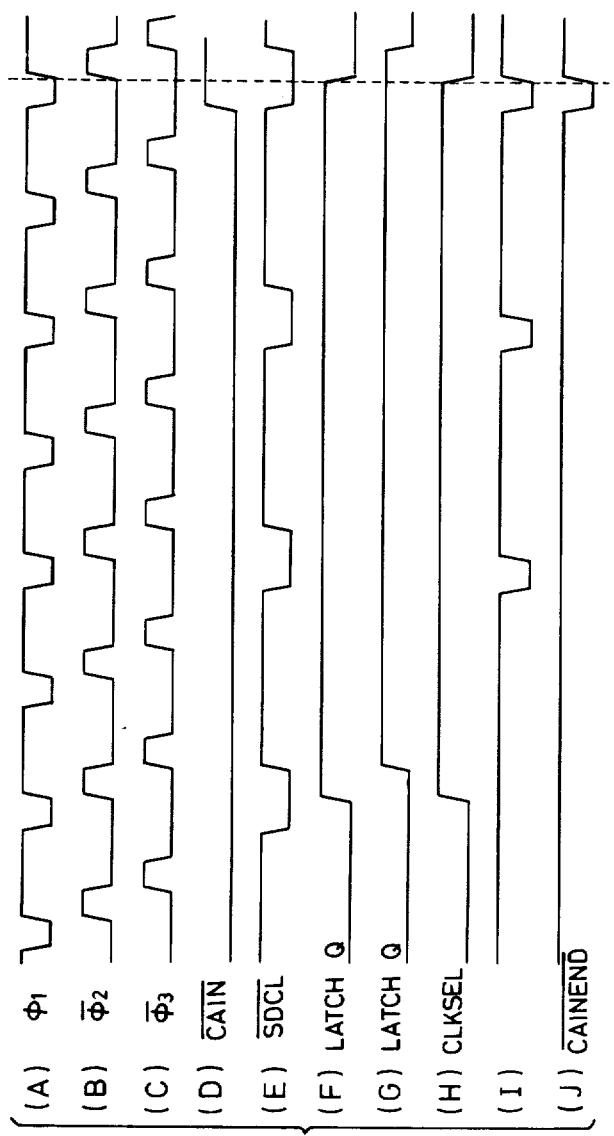
FIGS. 25(A) through 25(J) show signal waveforms at the cache-in end signal generator of FIG. 23.

A selector 58 is provided with the bus clock signal BCLK shown in FIG. 24(I) at its A-input terminal, and a NOR operation output of a NOR circuit 63 at its B-input terminal. The NOR circuit 63 carries out the above NOR operation for the clock signal $\phi_1$ shown in FIGS. 24(A) and 25(A) and the sampled send completion signal $\overline{SDCL}$ shown in FIGS. 24(E) and 25(E). The selector 58 selects the A-input when a clock select signal CLKSEL (described in detail later) is kept at the L-level as shown in FIG. 25(H). Alternatively, the selector 58 selects the B-input when the signal CLKSEL is kept at the H-level as shown in FIG. 24(H). The selected signal is supplied to a NAND circuit 59 via an output terminal Y of the selector 58. The NAND circuit 59 is also provided with an output of the AND circuit 66. An output of a NAND circuit 67 is fed to a clear terminal of a counter 60. With this circuit structure, the NAND circuit 59 produces a signal shown in FIG. 24(J) when the block access is possible. Adversely, the NAND circuit 59 produces a signal shown in FIG. 25(I) when the block access is cancelled.

The counter 60 is reset by the reset signal $\overline{RESET}$ of the output of the latch circuit 66 passed through the AND circuit 66, and then counts the output of the NAND circuit 59. First and second bits of the counted value which are outputted through terminals D0 and D1 are subjected to the NAND operation by a NAND circuit 64. The output signal of the NAND circuit 64 is synchronized with the block signal $\phi_1$. As a result, the cache-in end signal CAINEND is generated as shown in FIGS. 24(K) and 25(J). The cache-in end signal $\overline{CAINEND}$ is fed to a NAND circuit 61 together with the reset signal $\overline{RESET}$. The NAND circuit 61 produces the select clear signal $\overline{SELCLR}$, which is used to reset the flip-flop 55.

Figure 26:
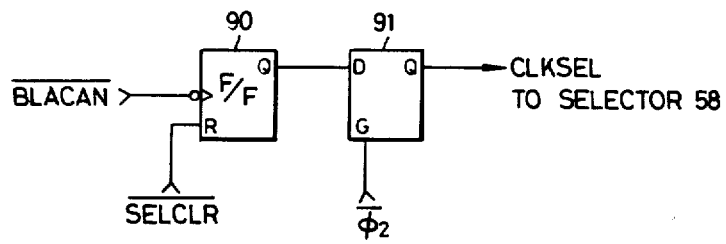
FIG. 26 is a circuit diagram of a clock select signal generator which is a structural part of the block access execution discriminating circuit shown in FIG. 2.
Figure 27:
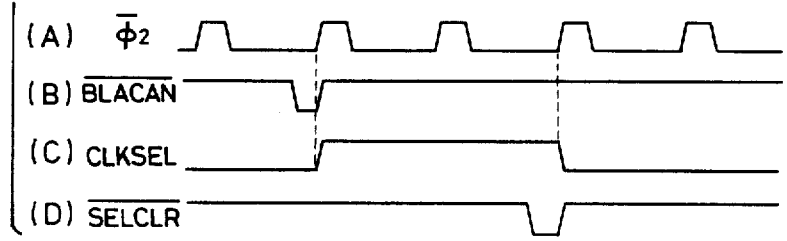
FIGS. 27(A) through 27(D) show signal waveforms at the clock select signal generator of FIG. 26.

The clock select signal CLKSEL is produced by a clock select signal generator (hereafter simply referred to as CLKSEL generator) shown in FIG. 26. The CLKSEL generator contained is also contained in the block access execution discriminating circuit 74 shown in FIG. 2. Referring to FIG. 26, a flip-flop 90 is reset by the select clear signal $\overline{SELCLR}$ shown in FIG. 27(D), and is set by the block access cancel signal $\overline{BLACAN}$ shown in FIG. 27(B). An Q-output of the flip-flop 90 is latched by a latch circuit 90 by the clock signal $\phi_2$ shown in FIG. 27(A). Then, the flip-flop 90 produces the clock select signal CLKSEL shown in FIG. 27(C), and supplies the same to the selector 58 shown in FIG. 23.

A write operation of data from cache memory 13 to the memory unit 16 may be carried out in accordance with a general write operation. That is, data read from the cache memory 13 is sequentially written into the memory unit 16 by a sequence of write addresses which are supplied to the control circuit 15 by the control circuit 12 of the bus master 11.

As described above, according to the present invention, the block access is in conformity with the memory or memory region of the access time shorter than the operating cycle of the operation unit 10. For this reason, the block access according to the present invention becomes faster than that for the conventional system. As a result, speeding-up of the system is possible, and system performance is improved.

In addition, the execution or cancellation of the requested block access is determined by the level of the block access acknowledge signal $\overline{BLACK}$. For this reason, at the time of the system design, it is not necessary to determine whether a certain memory or memory region of the memory unit 16 is used for the general access or block access. Hence, the degree of flexibility of system design can be improved.

Moreover, according to the present invention, even when the block access is cancelled by the bus slave, the data transfer in accordance with the general access can be performed. This enables reduction in the miss ratio and thus improve system performances.

The present invention is not limited to the embodiments, but various variations and modification may be made without departing from the scope of the present invention. The microprocessor 100 shown in FIG. 1 contains the cache memory 11. Instead, a system in which a cache memory is externally connected to a microprocessor having no built-in cache memory is within the scope of the present invention.

What is claimed is:

1. A block access system using a cache memory comprising:

main memory means for storing data;

operation means for carrying out operations and producing a single memory address and an access request to read out data stored in the main memory means;

cache memory means for storing the data read out from the main memory means;

a bus for connecting the cache memory means with the main memory means;

first control means for producing a block access request for requesting read-out of all data included in a block of a predetermined size in response to the access request from the operation means and inputting the data read out from the main memory means into the cache memory; and second control means for reading out data from the main memory means and sending back to the first control means a response signal which indicates one of execution and cancellation of the requested block access in response to the block access request from the first control means;

the first control means comprising first address supply means for supplying the single memory address from the operation means to the second control means when the response signal indicates the execution of the requested block access and for supplying the single memory address and memory addresses necessary to read out all the data of one block to the second control means when the response signal indicates the cancellation of the requested block access;

the second control means comprising second address supply means for supplying the main memory means with the single memory address and memory addresses necessary to read out all the data of one block when the requested block address is executed and for supplying the main memory means with the addresses provided from the first control means when the requested block address is cancelled.

2. A block access system using a cache memory as claimed in claim 1, wherein each of the first and second address supply means produces the memory addresses by incrementing the single memory address.

3. A block access system using a cache memory as claimed in claim 1, wherein the second control means determines any one of the execution and cancellation of the requested block address on the basis of an access time of a memory region of the main memory means in which the requested data is stored.

4. A block access system using a cache memory as claimed in claim 1, wherein the second control means sends back to the first control means the response signal indicating the execution of the requested block access when the access time of the memory region in which the requested data is stored is shorter than an operating time of the operation means.

5. A block access system using a cache memory as claimed in claim 1, wherein the second control means sends back to the first control means the response signal indicating the cancellation of the requested block access when the access time of the memory region in which the requested data is stored is longer than an operating time of the operation means.

6. A block access system using a cache memory as claimed in claim 4, wherein the memory region having the data requested is constituted by a static random access memory.

7. A block access system using a cache memory as claimed in claim 5, wherein the memory region having the data requested is constituted by a dynamic random access memory.

8. A block access system using a cache memory as claimed in claim 1, wherein the execution and cancellation is designated by a part of the memory address, and wherein the second control means further comprises a decoding means for decoding the part of the memory address to determinate one of the execution and cancellation of the requested block access.

9. A block access system using a cache memory as claimed in claim 1, wherein one of the execution and cancellation is asserted by a level of the response signal for the block access request.

10. A block access system using a cache memory as claimed in claim 1, wherein when the block access request is executed, all the data included in one block are successively sent from the main memory means to the cache memory means within one bus cycle of the bus.

11. A block access system using a cache memory as claimed in claim 1, wherein all the data included in one block are sent from the main memory means to the cache memory over a plurality of bus cycles of the bus.

12. A block access system using a cache memory as claimed in claim 1, wherein the data included in one block consists of a plurality of words.

13. A block access system using a cache memory as claimed in claim 1, wherein the operation means, the first control means and cache memory means are implemented in a microprocessor.

14. A microprocessor which may be connected to an external memory, comprising:
- a built-in cache memory for storing data read out from the external memory;
- bus control means for controlling an address supplied to the external memory and an input of the data read out from the external memory into the cache memory;
- an operation unit for executing a data processing;
- a block access request signal generator for outputting a signal for requesting a block access to the external memory, in response to a request from the operation unit;
- a clock supply circuit for generating a clock signal and supplying it to the external memory; and
- a block access discrimination circuit for discriminating a send completion signal and a block access acknowledge signal and designating a cancel of the block access request signal to the block access request signal generator when receiving the send completion signal from the external memory without receiving the block access acknowledge signal from the external memory;
- wherein the bus control means outputs a single address to the external memory and controls the input of data forming a block having a predetermined size sent from the external memory to the cache memory in synchronization with the clock signal when the block access discrimination circuit detects the block acknowledge signal; and outputs addresses which are sequentially incremented to the external memory an controls the input of data sent from the external memory to the cache memory in response to each of the addresses when the block access discrimination circuit receives the send completion signal without receiving the block access acknowledge signal.

* * * * *